UNITED STATES PATENT OFFICE.

JOSEPH B. DOUGLASS AND ELIJAH S. GREEN, OF COLUMBIA, MISSOURI.

IMPROVEMENT IN INSECT-DESTROYING COMPOSITIONS.

Specification forming part of Letters Patent No. 164,533, dated June 15, 1875; application filed March 20, 1875.

*To all whom it may concern:*

Be it known that we, JOSEPH B. DOUGLASS and ELIJAH S. GREEN, of Columbia, Boone county, Missouri, have invented a Compound to Prevent Borers from Entering Fruit-Trees, of which the following is a specification:

Gum-arabic, one pound; gum-camphor, two ounces; spirits of ammonia, two ounces; spirits of turpentine, two ounces; alcohol, three ounces; sugar of lead, one ounce.

The mode of preparation is as follows: Dissolve the gum-arabic in one quart of water; dissolve the gum-camphor in the alcohol, and, when dissolved, mix all the ingredients together and put in a bottle for use.

The mode of application is to clean the ground at the root of the tree, shake the bottle well before using, and apply the remedy with a brush to the body of the tree, commencing at the ground and continuing up from six (6) to twelve (12) inches.

The compound should be applied to the trees from the last of May to the 10th of June. Should the rains wash the compound off, renew it at any time up to the 1st of August, when all danger from the depredations of the worms have passed.

The above remedy will not only prevent the borers and other insects from entering the trees at the point where applied, but also will destroy all worms that are just entering the same, and is also a stimulus to the tree.

We claim—

The improved compound herein described for protecting trees from boring insects, consisting of sugar of lead, alcohol, spirits of turpentine, aqua ammonia, and gum arabic and camphor, in about the proportions specified.

JOSEPH B. DOUGLASS.
   ELIJAH S. GREEN.

Witnesses:
 ROBERT S. TODD,
 JAMES H. WAUGH.